No. 887,437. PATENTED MAY 12, 1908.
J. L. SMITH.
REEL CLAMP FOR FISHING RODS.
APPLICATION FILED FEB. 24, 1908.

WITNESSES:
Chas. H. Luther
Ada E. Hagerty

INVENTOR:
Joseph L. Smith
by Joseph H. Miller
ATTORNEY

THE NORRIS PETERS CO., WASHINGTON, D. C.

UNITED STATES PATENT OFFICE.

JOSEPH L. SMITH, OF PAWTUXET, RHODE ISLAND.

REEL-CLAMP FOR FISHING-RODS.

No. 887,437.   Specification of Letters Patent.   Patented May 12, 1908.

Application filed February 24, 1908. Serial No. 417,369.

*To all whom it may concern:*

Be it known that I, JOSEPH L. SMITH, a citizen of the United States, residing at Pawtuxet, in the county of Providence and State of Rhode Island, have invented a new and useful Improvement in Reel - Clamps for Fishing - Rods, of which the following is a specification.

This invention has reference to an improvement in fishing rods and more particularly to an improvement in detachable clamps for securing reels to fishing rods.

Fishing rods usually have a fixed ring and a sliding ring on the reel seat for securing the reel to the rod. When the rod is in use, particularly with a large reel, the sliding ring is liable to and does at times work loose, thereby allowing the reel to drop off, which causes considerable annoyance to the user and the liability of losing the reel.

The object of my invention is to improve the construction of a reel clamp for fishing rods whereby the reel is more firmly secured to the reel seat of the rod than has heretofore been done.

My invention consists in the peculiar and novel construction of a detachable reel clamp for fishing rods, said reel clamp having details of construction, as will be more fully set forth hereinafter and claimed.

Figure 1:
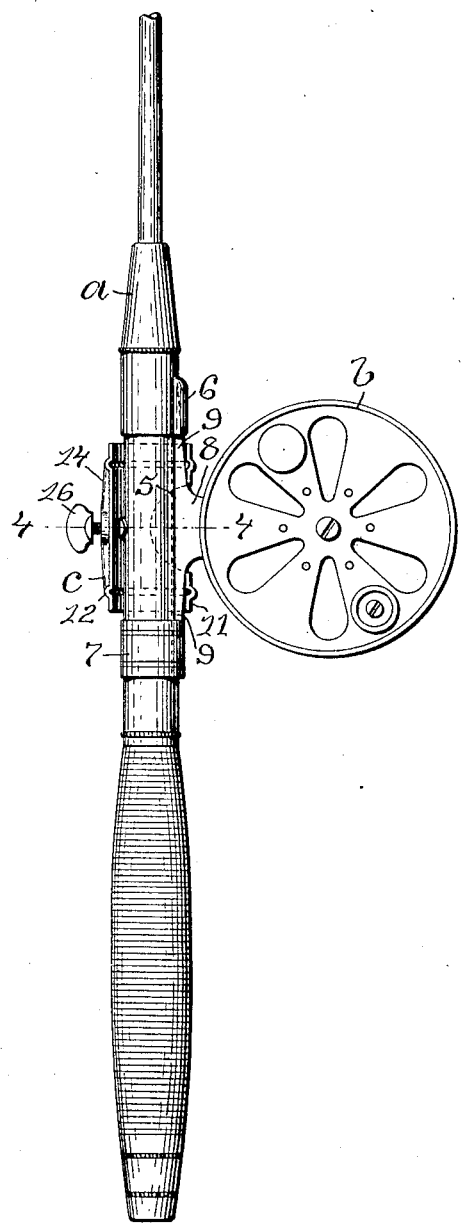
Figure 2:
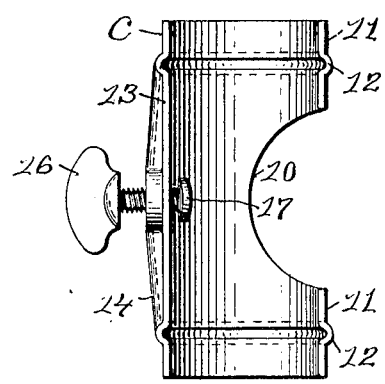
Figure 3:
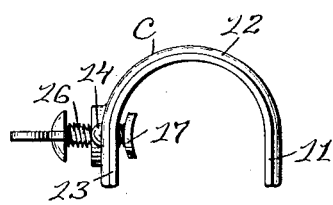

Figure 1 is a side view of the butt end of a fishing rod, showing a reel secured to the reel seat with my improved detachable reel clamp. Fig. 2 is an enlarged side view of the reel clamp detached from the rod. Fig. 3 is an enlarged end view of the reel clamp, and Fig. 4 is an enlarged transverse sectional view taken on line 4 4 of Fig. 1 through the rod, reel clamp and portion of the reel.

In the drawings, $a$ indicates a fishing rod, $b$ a reel, and $c$ my improved detachable reel clamp.

The fishing rod $a$ has the usual reel seat 5 at one end of which is a fixed ring 6 shaped to receive a tapered end of the reel base and at the other end of which is a sliding ring 7 shaped to slide over the other tapered end of the reel base, as shown in Fig. 1.

Figure 4:
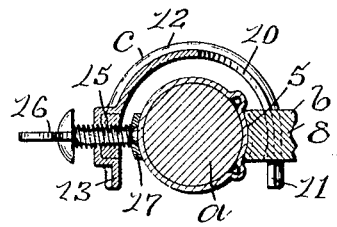

The reel $b$ may be of any construction having the usual base 8 with the tapered ends 9 9 shaped to fit on the reel seat 5 of the fishing rod, as shown in Figs. 1 and 4.

My improved detachable reel clamp $c$ may be of any construction adapted to grasp the base 8 of the reel and clamp the reel to the reel seat of the rod. In the preferred form, as shown in the drawings, the body of the clamp $c$ is constructed of sheet metal bent U-shape in cross section and constructed to have the semi-circular opening 10 in one side, the end clamping arms 11 11 strengthened by the transverse ribs 12 12 and the opposite side 13 strengthened by the longitudinal rib 14 and having the central screw-threaded hole 15. A thumb clamping screw 16 extends through the screw-threaded hole 15 and has a slightly curved disk 17 swiveled on its inner end, as shown in Fig. 4.

In the use of my improved detachable reel clamp a reel is placed on the reel seat of the rod in the usual way and may be held in position by the fixed and sliding rings 6 and 7. The reel clamp $c$ is now placed over the reel seat portion of the rod in a position for the clamping arms 11 11 of the clamp to straddle the reel base and grasp the tapered ends 9 9 of the reel base, and for the disk 17 on the inner end of the clamping screw to engage with the rod at a point opposite the reel seat, as shown in Figs. 1 and 4. The clamping screw 16 is now tightened and the reel firmly clamped to the reel seat of the rod.

It is evident that the construction of my improved detachable reel clamp for fishing rods may be varied within wide limits without materially affecting the spirit of my invention.

Having thus described my invention, I claim as new and desire to secure by Letters Patent;

1. A detachable reel clamp for fishing rods consisting of a body member U-shape in cross section and having arms adapted to straddle and grasp the base of a reel, and an oppositely-disposed clamping screw adapted to engage with the rod.

2. A detachable reel clamp $c$ for fishing rods consisting of a body member U-shape in cross section and having the clamping arms 11 11 and the opposite side 13 in which is a central screw-threaded hole 15, and a clamping screw 16 extending through the hole 15 and having the swiveled disk 17 on its inner end, as described.

In testimony whereof I have signed my name to this specification in the presence of two subscribing witnesses.

JOSEPH L. SMITH.

Witnesses:
  ADA E. HAGERTY,
  J. A. MILLER.